(No Model.)
T. F. LANGLEY.
SHUTTER HINGE.
No. 600,540. Patented Mar. 15, 1898.
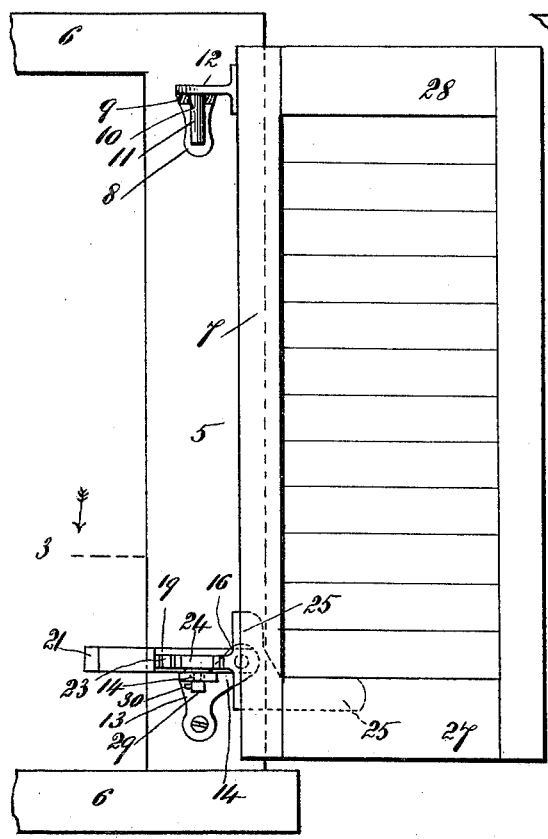
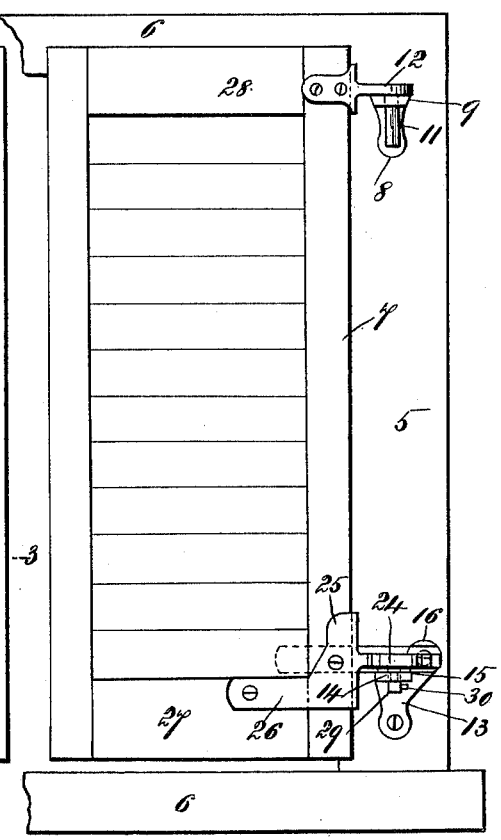
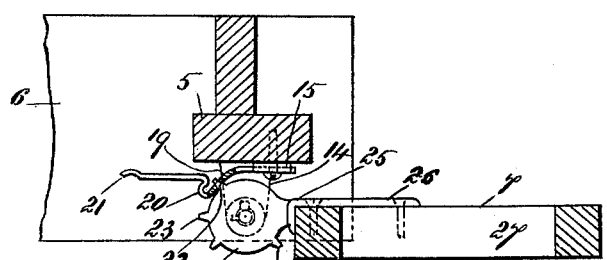
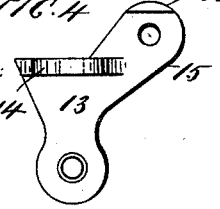
WITNESS
John Buckler
L. M. Muller
INVENTOR
Thomas F. Langley
BY
Edgar Tate & Co.
ATTORNEYS.
THE NORRIS PETERS CO., PHOTO-LITHO., WASHINGTON, D. C.

UNITED STATES PATENT OFFICE.

THOMAS FRENCH LANGLEY, OF HAVERHILL, MASSACHUSETTS, ASSIGNOR OF ONE-HALF TO BELFORD PEACOCK, OF SAME PLACE.

SHUTTER-HINGE.

SPECIFICATION forming part of Letters Patent No. 600,540, dated March 15, 1898.

Application filed July 28, 1897. Serial No. 646,206. (No model.)

*To all whom it may concern:*

Be it known that I, THOMAS FRENCH LANGLEY, a citizen of the United States, residing at Haverhill, in the county of Essex and State of Massachusetts, have invented certain new and useful Improvements in Hinges for Shutters, of which the following is a full and complete specification, such as will enable those skilled in the art to which it appertains to make and use the same.

My invention relates to hinges for shutters, and more particularly to that class thereof which are especially designed for locking in such position as will maintain the shutter in the open or shut position or at different angles of adjustment.

The object of the invention is to provide a hinge of the above-described class by means of which a shutter may be conveniently hung and readily detached from the frame of the window or other structure, while insuring against its accidental removal.

A further object of the invention is to provide means whereby the shutter through its hinges may be readily adjusted to the desired angle, which will be simple in construction, efficient in operation, and inexpensive to manufacture.

A still further object of my invention is to provide a strong and durable hinge-plate whereby the connection of such plate with the shutter, as well as the said shutter itself, will be strengthened and prevented from sagging.

The invention consists in those novel features of construction hereinafter set forth and described, and more particularly pointed out in the claims hereto appended.

Figure 1 is an outside view of a part of a window-frame, showing a shutter hinged thereto and locked in the open position; Fig. 2, a similar view of the shutter closed; Fig. 3, a section on the line 3 3 of Fig. 1; Fig. 4, a side view of that part of the lower hinge which is secured to the window-frame, and Fig. 5 a plan view thereof.

In the drawings forming part of this specification the separate parts of my improvement are designated by the same numerals of reference in each of the views, and in said drawings I have shown at 5 one side of a window-frame, and at 6 a part of the top and of the bottom thereof. I have also shown a shutter 7, and these parts are all of the usual construction.

The hinge which I employ for connecting the shutter with the frame consists of two parts, one of which is connected with the frame and the other with the shutter, and that part of the upper hinge which is connected with the frame consists of a plate 8, which is secured to the side of the frame and which is provided with an outwardly-directed extension 9, and this extension is provided with a hole 10, which is adapted to receive a downwardly-directed pin 11, formed on an outwardly-directed projection 12, which forms a part of that part of the upper hinge which is secured to the shutter.

That part of the lower hinge which is secured to the frame of the window consists of a plate 13, which is provided with an outwardly-directed projection 14, which extends at right angles therefrom, and with an upwardly and outwardly directed extension or arm 15, which projects in the same plane therewith, and formed transversely of the upper portion of the top of said arm or projection 15 is a transverse lug 16, and said outwardly-directed projection 14 of the plate 13 is provided with a circular opening 17, which is provided with an inwardly-directed extension 18, and secured transversely of the arm or projection 15 is a spring-arm 19, in which is formed an outwardly-directed loop 20 and which is provided with an inwardly-directed extension 21, and formed in said spring-arm is a perforation or opening 22, which is adapted to receive teeth or projections 23, formed on a circular plate or head 24, which is formed on that part of the lower hinge which is secured to the shutter.

That part of the lower hinge which is secured to the shutter consists of a plate 25, which is secured to the outer side of the shutter and which is provided with a backwardly-directed arm or extension 26, which is secured to the bottom portion 27 of the shutter-frame, the object of this construction being to increase the strength of the shutter-frame and to prevent as much as possible the separation of the parts thereof; but said backwardly-directed extension or arm 26 on that part of the lower hinge which is secured to the shutter is not absolutely essential and may or may not be employed, and that part of the upper hinge which is secured to the shutter may also be projected across the end 28 of the shutter-frame, if desired.

The circular head 24, formed on or secured to that part of the lower sash which is secured to the shutter and on which the teeth or projections 23 are formed, is provided with a downwardly-directed pin 29, which passes through the hole 17 in the outwardly-directed extension 14 of the plate 13, which is secured to the window-frame, and said pin is provided near its lower end with a lug or projection 30, which is adapted to pass through the extension 18 of the said hole or opening 17, and when the shutter is turned so that the lug or projection 30 will project at an angle to the extension 18 of said hole or opening 17 the shutter cannot be removed and cannot be accidentally detached from the window-frame, and in order to lift said shutter out of position it must be turned so that the lug or projection 30 on the pin 29 will pass through the extension 18 of the hole or opening 17, as will be readily understood.

The pin 11 on that part of the upper hinge which is secured to the shutter is longer than the pin 29 on that part of the lower hinge which is secured to the shutter, and by means of this construction the suspension of the shutter or the connection thereof with that part of the hinges secured to the window-frame is facilitated, the upper pins being first placed in position, after which the lower pins may be guided into position, as will be readily understood.

The spring-arm 16 is secured to the arm or extension 15 of the plate 13 between the outwardly-directed projection 14 and the lug 16 on said arm or projection 14, the object of this construction being to prevent the spring-arm 19 from moving up and down in or on its supports, and the operation will be readily understood from the foregoing description when taken in connection with the accompanying drawings and the following statement thereof.

By pulling inwardly on the extension 21 of the spring-arm 19 said spring-arm will be disconnected from the teeth or projections 23 on the circular head 24 on that part of the lower hinge which is connected with the shutter, and said shutter may be opened or closed, as may be desired, and by means of said teeth or projections the shutter may be locked in the open position, as shown in Fig. 1, or in the closed position, as shown in Fig. 2, and it will also be apparent that said shutter may be held at any desired angle, this position of the shutter being made possible by means of the number of the teeth or projections 23.

My improvement is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. In a hinge for shutters, the combination with a plate adapted to be secured to the window-frame having a perforated extension at right angles thereto, and an upwardly-directed extension, of a plate 25 provided with a disk 24 having a plurality of teeth on its periphery and a downwardly-directed pivot-pin adapted to coöperate with said first-mentioned plate, and a spring having an opening therein adapted to engage said teeth successively whereby the shutter may be adjusted and maintained at any desired angle said spring being secured at one end to said first-mentioned plate, substantially as described.

2. In a hinge for shutters, the combination with a plate adapted to be secured to the window-frame having a perforated extension at right angles thereto, an upwardly-directed extension, and a laterally-projected abutment thereon, of a plate 25, provided with a horizontally-disposed disk 24, having a plurality of projections on its periphery, and a downwardly-directed pivot-pin adapted to coöperate with said first-mentioned plate, and a spring provided with a protruding loop having an opening therein adapted to engage said projections successively whereby the shutter may be adjusted and maintained at any angle, said spring being secured at one end to said first-mentioned plate beneath said abutment whereby a vertical movement of said spring is prevented, substantially as described.

In testimony that I claim the foregoing as my invention I have signed my name, in presence of the subscribing witnesses, this 23d day of July, 1897.

THOMAS FRENCH LANGLEY.

Witnesses:
ROBERT D. TRASK,
LIZZIE M. LANGLEY.